Dec. 23, 1958            R. KAISER            2,865,234
METHOD AND APPARATUS FOR SHAPING SAW TEETH
Filed Nov. 25, 1957            2 Sheets-Sheet 1
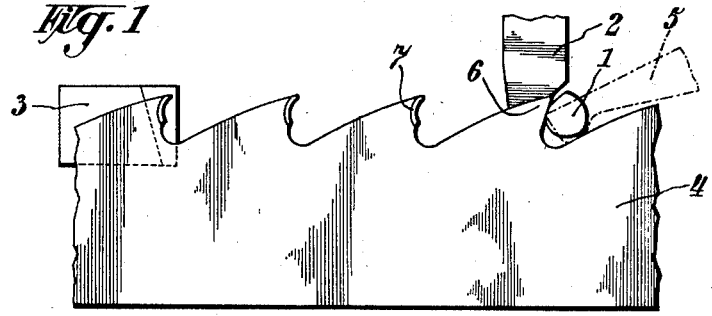
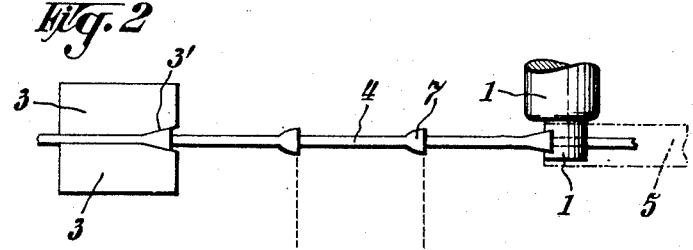
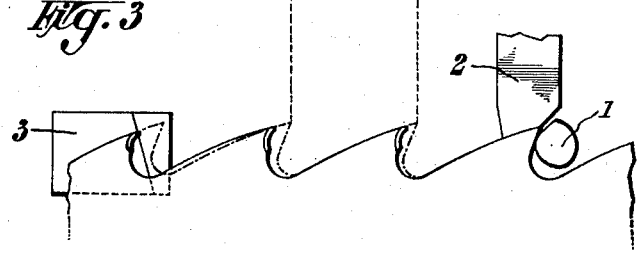
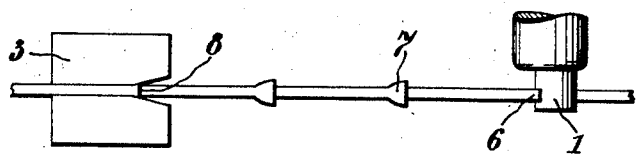
INVENTOR
Richard Kaiser
By Alex. E. MacRae
Attorney Dec. 23, 1958  R. KAISER  2,865,234
METHOD AND APPARATUS FOR SHAPING SAW TEETH
Filed Nov. 25, 1957  2 Sheets-Sheet 2
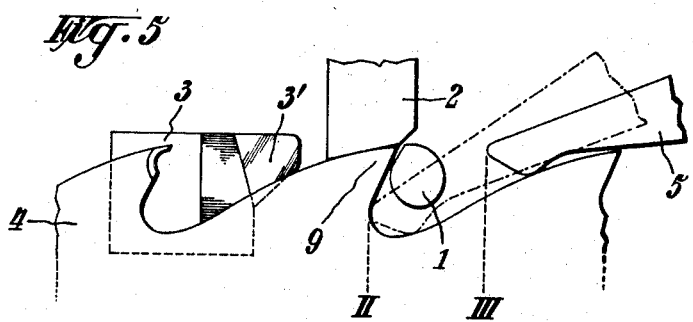
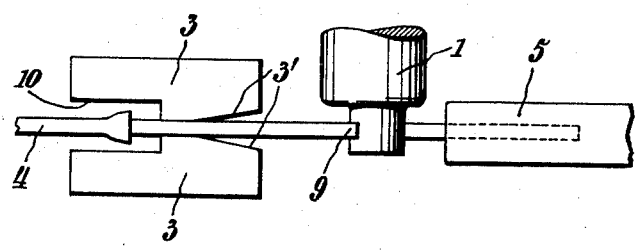
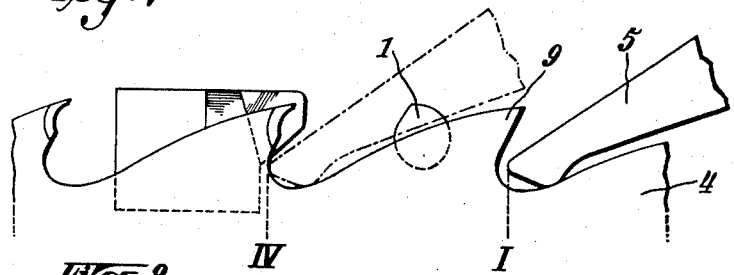
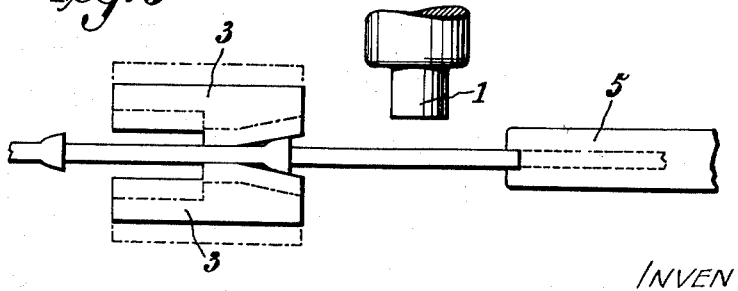
INVENTOR
Richard Kaiser
By Alex. E. MacRae
Attorney United States Patent Office 2,865,234
Patented Dec. 23, 1958

2,865,234

METHOD AND APPARATUS FOR SHAPING SAW TEETH

Richard Kaiser, Warthausen, near Biberach (Riss), Germany, assignor to Vollmer-Werke Maschinenfabrik Gesellschaft mit beschränkter Haftung, Biberach, Wurttemburg, Germany Application November 25, 1957, Serial No. 698,628

2 Claims. (Cl. 76—54)

This invention relates to a method and apparatus for shaping saw teeth.

It has heretofore been proposed to employ a machine for shaping saw teeth wherein each tooth is first subjected to a swaging step and then to a flattening step wherein a pair of jaws shape the swaged tooth. With such known machine, it is difficult to synchronize the operation of the two steps whereby the relative position of each tooth as it is presented to the flattening jaws remains constant. It will be apparent that, unless such relative position remains constant, the shape of the teeth will not be uniform.

It is an object of this invention to provide a method and apparatus for shaping saw teeth involving a swaging step and a flattening step wherein the relative position of each tooth as it is subjected to the flattening step remains constant wherein the resulting teeth are of substantially uniform shape.

The invention will be described with reference to the accompanying drawings, in which Figure 1 is a side elevation of a saw including a schematic illustration of known machine parts as applied thereto, Figure 2 is a plan view of the saw and machine parts as shown in Figure 1, Figure 3 is a side elevation of a saw and known machine parts in different position, Figure 4 is a plan view of the saw and machine parts shown in Figure 3, Figure 5 is a side elevation of a saw including a schematic illustration of machine parts arranged in accordance with the invention, Figure 6 is a plan view of the saw and machine parts shown in Figure 5, Figure 7 is a side elevation showing the saw and machine parts of Figure 5 in somewhat different position, and Figure 8 is a plan view of the saw and machine parts shown in Figure 7.

Referring to Figures 1 to 4, the swaging position of the machine is defined by the rotating, axially displaceable swage bolt 1 and the upwardly and downwardly movable anvil 2. A fixed distance away from the swaging position in the feed direction of the saw is the flattening position. At the swaging position there are provided clamping jaws, not shown in the drawing, situated below the swaging bolt. With these, saw blade 4 is clamped each time during its processing. Saw blade 4 is advanced in stages by the known feed pawl 5. At the swaging position the individual saw teeth 6 are swaged or rolled wide by rotating swage bolt 1, so that the individual tooth is given the spread denoted by 7. At the flattening position the tooth spread or swaging 7 is compressed or flattened to a certain extent between the wedge-like pressure faces 3' of the flattening jaws which are capable of being pressed together transversely to the feed direction of the saw, so that an exactly equal cutting width will be obtained from all the saw teeth. Hitherto the flattening position was a fixed distance away from the swaging position, so that, for example, as shown in Figures 1 to 4, flattening began only at the third or fourth swaged tooth.

This swaging and flattening method, or the corresponding machine, works satisfactorily if saw 4 possesses completely accurate spacing, i. e. when the distance denoted by $t$ between teeth is always constant. However, in practice this is not the case. On the one hand saws of the same kind may have different spacings, and on the other hand it frequently happens that the spacing in one saw varies. In Figures 3 and 4 a part of saw 4 is shown where the spacing is greater. The saw with accurate spacing $t$ is shown in Figure 3 with broken and dotted lines. As Figures 3 and 4 show, the greater spacing results in swaged saw tooth 6, 7 arriving at a different position between flattening jaws 3. Consequently with wider spacing, tooth spread 7 is compressed too far so that the cutting edge denoted in Figure 4 by 8 is too narrow. Conversely, too wide a cutting edge is obtained when the spacing is narrower than the standard spacing $t$. Such differently flattened saws in practice are unusable, so that hitherto saws of various spacing could not be swaged and flattened by machine in a single operation.

As previously indicated, the purpose of the invention is to find a solution to the problem of guaranteeing constant flattening regardless of the tooth spacing.

Figures 5 to 8 illustrate the process and apparatus of the present invention, the complete swaging and flattening steps of which will now be described, starting from the position represented in Figure 7, where feed pawl 5 is in a position denoted by I.

Feed pawl 5 moves from position I into the position denoted in Fig. 5 by II, forwardly in the feed direction. This brings tooth 9 in Fig. 7 into the swaging position (Fig. 5). The saw blade is held firmly by the unrepresented clamping jaws on the one hand and the downwardly moving anvil 2, on the other hand, which anvil comes to rest against the back of the saw tooth, whereupon swaging is now carried out by swage bolt 1, which has moved into the tooth gap and is now rotating. Prior to this feed pawl 5 has already moved back from position II to position III. This return motion has left the way open for the swaging bolt to move forward into the tooth gap. As Figure 5 shows, the feed pawl remains at rest in position III on the back of the next tooth, i. e. it does not yet drop into the next tooth gap. After completion of swaging the clamping of the saw blade is released, anvil 2 moves upwards and swage bolt 1 retracts from the tooth gap. Feed pawl 5 now moves forward again from position III and when it reaches position II it comes to rest against swaged tooth 9 and pushes the saw blade into the position IV shown in Fig. 7. As a result the tooth that has just been swaged comes between form flattening jaws 3 which at this moment are in their open position. Flattening of the swaged tooth now takes place by the pressing together of form jaws 3, pressing the swaged tooth between the wedge faces 3' of the jaws. Any reverse motion of the saw blade during the flattening process can be prevented in various ways. The saw blade is either held fast during flattening by the clamping jaws at the swage position, or the feed pawl 5 remains in its position IV in which it constitutes a support for the front of the flattened tooth, or these two retaining processes may be effective simultaneously. After flattening feed pawl 5 moves back from position IV into position I, dropping into the next tooth gap. After release of the saw blade clamping means the described process is repeated for the next saw tooth.

In Figure 8 the flattening jaws are drawn in solid lines in the flattening position and in broken lines in the open position.

Apart from the new motion or control of feed pawl 5, which is effected, for example, by a suitably shaped cam wheel, the swaging and flattening machine differs from the prior art in that flattening jaws 3, seen in the saw feed direction, are situated directly behind the swage bolt or the clamping tools for the saw blade. From Figures 5 and 7 it is further evident that wedge faces 3' are formed on backwardly projecting lobes of jaws 3, which are so disposed that feed pawl 5 can move under the mentioned lobes into position IV. Further, each flattening jaws 3 is provided with an opening 10. As Figure 6 shows the swaged and flattened saw tooth is located inside jaw openings 10 when the swaging of the next saw tooth takes place.

It should also be mentioned that adjustment of the machine for various flattening widths is possible by making the feed pawl path from III to IV adjustable and controllable. In this way an insertion of various depths of the swaged tooth between the wedge faces 3' of the flattening jaws can be achieved.

The present invention thus solves the problem mentioned above.

The feed pawl moves a tooth forward into the swaging position, then moves back far enough so that the movement of the swage bolt will be unobstructed. After swaging has been completed it moves forward again and pushes the tooth between the flattening jaws, whereupon it returns to the place where it falls into the next tooth gap.

In contrast to the previously described method, it is always only the last swaged tooth that is advanced by the feed pawl between the flattening jaws and flattened, resulting in the marked advantage that differences in the tooth spacing of different saws and within the same saw no longer affect the accuracy of the flattening operation. Thus complete accuracy of flattening is assured.

In order to prevent any backing up of the saw from wedge faces 3' of the flattening jaws with certainty, according to another feature of the method the feed pawl can be made to secure the swaged tooth between the flattening jaws against any motion backwards. In other words, during the flattening step the feed pawl remains in the neighboring tooth gap. The machine also forming the subject of the invention, for execution of the new method, is characterized, apart from the corresponding control of the feed pawl motion, also by the fact that the flattening jaws, seen in the direction of feed, are situated directly behind the swage bolt or clamping tools for the saw in the swaging position.

I claim:

1. A method of shaping saw teeth which comprises actuating a pawl to engage a saw tooth and move it into swaging position, immediately reversing movement of said pawl to move it backwardly out of engagement with said tooth, applying a swaging bolt to said tooth to swage said tooth, forwardly moving said pawl into engagement with said tooth to advance it into flattening position, rearwardly moving said pawl out of engagement with said tooth and into engagement with a next tooth, and applying flattening pressure to said first tooth.

2. A method of shaping saw teeth as defined in claim 1, including the step of utilizing said pawl when in engagement with said next tooth to restrain movement of said swaged tooth during the application of said flattening pressure.

References Cited in the file of this patent

UNITED STATES PATENTS

| | | |
|---|---|---|
| 1,539,079 | Filstrup | May 26, 1925 |
| 2,800,039 | Vollmer | July 23, 1957 |